US012025147B2

(12) United States Patent
Harner et al.

(10) Patent No.: US 12,025,147 B2
(45) Date of Patent: Jul. 2, 2024

(54) PROCESSES AND TOOLING ASSOCIATED WITH COATING APPLICATION

(71) Applicant: Raytheon Technologies Corporation, Farmington, CT (US)

(72) Inventors: John Harner, Florence, MA (US); John D. Riehl, Hebron, CT (US); Gary A. Wigell, Lansing, MI (US); Michael A. Morden, Holt, MI (US); Brandon A. Gates, DeWitt, MI (US)

(73) Assignee: RTX Corporation, Farmington, CT (US)

( * ) Notice: Subject to any disclaimer, the term of this patent is extended or adjusted under 35 U.S.C. 154(b) by 74 days.

(21) Appl. No.: 17/966,119

(22) Filed: Oct. 14, 2022

(65) Prior Publication Data

US 2023/0105504 A1 Apr. 6, 2023

Related U.S. Application Data

(62) Division of application No. 15/656,249, filed on Jul. 21, 2017, now abandoned.

(51) Int. Cl.

*F04D 29/32* (2006.01)
*B05B 1/18* (2006.01)
*B05B 1/20* (2006.01)
*B05B 13/02* (2006.01)
*B05C 5/02* (2006.01)
(Continued)

(52) U.S. Cl.

CPC .............. *F04D 29/325* (2013.01); *B05B 1/18* (2013.01); *B05B 1/205* (2013.01); *B05B 13/0242* (2013.01); *B05C 5/0275* (2013.01); *B05C 11/1039* (2013.01); *B05C 13/02* (2013.01); *B05D 1/002* (2013.01); *B05D 1/02* (2013.01); *F04D 29/388* (2013.01); *B05B 14/40* (2018.02); *B05B 16/40* (2018.02); *F05D 2220/32* (2013.01); *F05D 2230/90* (2013.01); *F05D 2300/611* (2013.01)

(58) Field of Classification Search

CPC ..... B05B 1/18; B05C 5/0275; B05C 11/1039; B05C 13/02; B05D 1/002; B05D 1/02
See application file for complete search history.

(56) References Cited

U.S. PATENT DOCUMENTS 2,762,149 A 9/1956 Mears
2,972,353 A 2/1961 Quest
(Continued)

FOREIGN PATENT DOCUMENTS

CN 203189332 U 9/2013
CN 105798004 A 7/2016
(Continued)

*Primary Examiner* — Nathan T Leong
(74) *Attorney, Agent, or Firm* — Bachman & LaPointe, P.C.

(57) ABSTRACT

A drench system includes a rotating mount to rotate a workpiece, a showerhead to dispense a fluid onto the workpiece; and a tray to collect the fluid and recirculate the fluid to the shower. A method of repairing or remanufacturing a coating includes abrading a surface to at least partially remove a portion of a coating to leave an abraded surface; applying a sol-gel over the abraded surface; applying a corrosion resistant primer onto the sol-gel; and applying an erosion coating onto the corrosion resistant primer.

6 Claims, 10 Drawing Sheets

(51) Int. Cl.

| | |
|---|---|
| ***B05C 11/10*** | (2006.01) |
| ***B05C 13/02*** | (2006.01) |
| ***B05D 1/00*** | (2006.01) |
| ***B05D 1/02*** | (2006.01) |
| ***F04D 29/38*** | (2006.01) |
| *B05B 14/40* | (2018.01) |
| *B05B 16/40* | (2018.01) |

(56) References Cited

U.S. PATENT DOCUMENTS

| | | | | |
|---|---|---|---|---|
| 5,678,583 | A | 10/1997 | Conroy et al. | |
| 5,915,452 | A | 6/1999 | Conroy et al. | |
| 6,451,515 | B2 | 9/2002 | Takamori et al. | |
| 6,454,536 | B1 | 9/2002 | Evans et al. | |
| 2008/0210260 | A1 | 9/2008 | Porter et al. | |
| 2012/0308732 | A1* | 12/2012 | Chiang | B05B 14/43 118/602 |
| 2015/0079301 | A1 | 3/2015 | Nemani et al. | |
| 2015/0146198 | A1 | 5/2015 | Milliot et al. | |
| 2015/0175814 | A1 | 6/2015 | Aizenberg et al. | |

FOREIGN PATENT DOCUMENTS

| | | | | |
|---|---|---|---|---|
| DE | 29612193 | U1 | | 9/1996 |
| DE | 29612193 | | * | 6/1997 |

* cited by examiner

PROCESSES AND TOOLING ASSOCIATED WITH COATING APPLICATION

CROSS-REFERENCE TO RELATED APPLICATIONS

This application is a divisional of U.S. patent application Ser. No. 15/656,249, filed Jul. 21, 2017.

BACKGROUND

The present disclosure relates to tooling, more particularly, to a drench system to apply a uniform coating.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Gas turbine engines typically have rows of circumferentially spaced airfoils mounted on respective rotor disks for rotation about an engine axis. Advanced configurations feature shroud-less hollow airfoils manufactured of lightweight materials. The airfoils are designed to high tolerances and typically include a coating to accommodate significant operational requirements.

Airfoil coatings erode over time and may be reapplied as part of a repair strategy. Sub-surface coatings such as primers or adhesion promoters may also need to be repaired or reapplied as part of the repair strategy. For such repairs, conventional methods such as spray or submersion in a tank filled with the fluid may not be optimal due to the high cost and short pot life of the material.

SUMMARY

A drench system according to one disclosed non-limiting embodiment of the present disclosure includes a rotating mount to receive a workpiece; a showerhead to dispense a fluid onto the workpiece; and a drainage tray to collect the fluid and a pump to recirculate the fluid to the showerhead.

A further aspect of the present disclosure includes an enclosure to contain the workpiece.

A further aspect of the present disclosure includes that the enclosure is transparent.

A further aspect of the present disclosure includes that the rotating mount rotates between 10-15 rpm.

A further aspect of the present disclosure includes that the showerhead dispenses the fluid at about 2 gallons/minute.

A further aspect of the present disclosure includes that the rotating mount is rotated by an electric motor about an axis.

A further aspect of the present disclosure includes that the workpiece is mounted along the axis.

A further aspect of the present disclosure includes that the fluid is sol-gel.

A further aspect of the present disclosure includes that the workpiece is a fan blade.

A further aspect of the present disclosure includes that the tray is sized to permit the workpiece to be drenched for at least two minutes as the showerhead dispenses the fluid at about 2 gallons/minute.

A method of applying a fluid to a workpiece according to one disclosed non-limiting embodiment of the present disclosure includes rotating a workpiece about an axis; dispensing a fluid from a showerhead onto the workpiece; collecting the fluid while dispensing; and recirculating the fluid to the showerhead.

A further aspect of the present disclosure includes that the workpiece is a fan blade.

A further aspect of the present disclosure includes dispensing a sol-gel.

A further aspect of the present disclosure includes that the showerhead dispenses the fluid at about 2 gallons/minute.

A further aspect of the present disclosure includes rotating the workpiece at between 10-15 rpm.

A further aspect of the present disclosure includes streaming the fluid off the workpiece.

The foregoing features and elements may be combined in various combinations without exclusivity, unless expressly indicated otherwise. These features and elements as well as the operation of the invention will become more apparent in light of the following description and the accompanying drawings. It should be appreciated, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
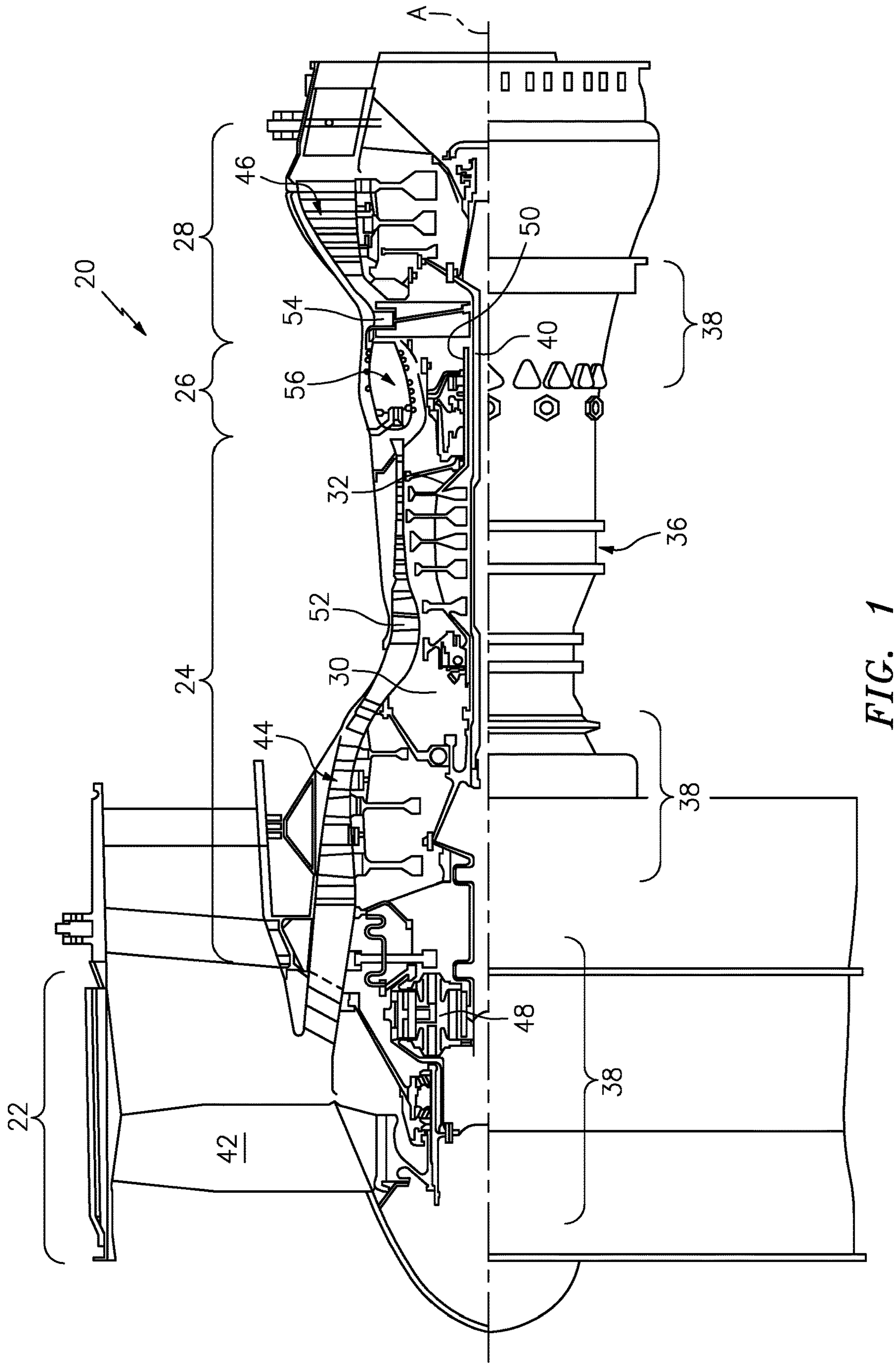
FIG. 1 is a schematic cross-section of a gas turbine engine.

FIG. 1 schematically illustrates a gas turbine engine 20. The gas turbine engine 20 as disclosed herein has a two-spool turbofan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be appreciated that the concepts described herein are not limited only thereto.

The engine 20 generally includes a low spool 30 and a high spool 32 mounted for rotation around an engine central longitudinal axis A relative to an engine static structure 36 via several bearing compartments 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor 52 ("HPC") and high pressure turbine 54 ("HPT"). A combustor 56 is arranged between the HPC 52 and the HPT 54. The inner shaft 40 and the outer shaft 50 are concentric and rotate around the engine central longitudinal axis A which is collinear with their longitudinal axes.

Core airflow is compressed by the LPC 44 then the HPC 52, mixed with fuel and burned in the combustor 56, then expanded over the HPT 54 and the LPT 46. The turbines 46, 54 rotationally drive the respective low spool 30 and high spool 32 in response to the expansion. The main engine shafts 40, 50 are supported at a plurality of points by the bearing compartments 38. It should be appreciated that various bearing compartments 38 at various locations may alternatively or additionally be provided.

The fan section 22 includes a plurality of circumferentially spaced fan blades 58 which may be made of a high-strength, low weight material such as an aluminum alloy, titanium alloy, composite material or combinations thereof. It should be understood that although a single fan stage typical of a high bypass gas turbofan engine architecture is illustrated and described in the disclosed embodiments, other stages which have other blades inclusive but not limited to fan blades, high pressure compressor blades and low pressure compressor blades may also benefit herefrom.

Figure 2:
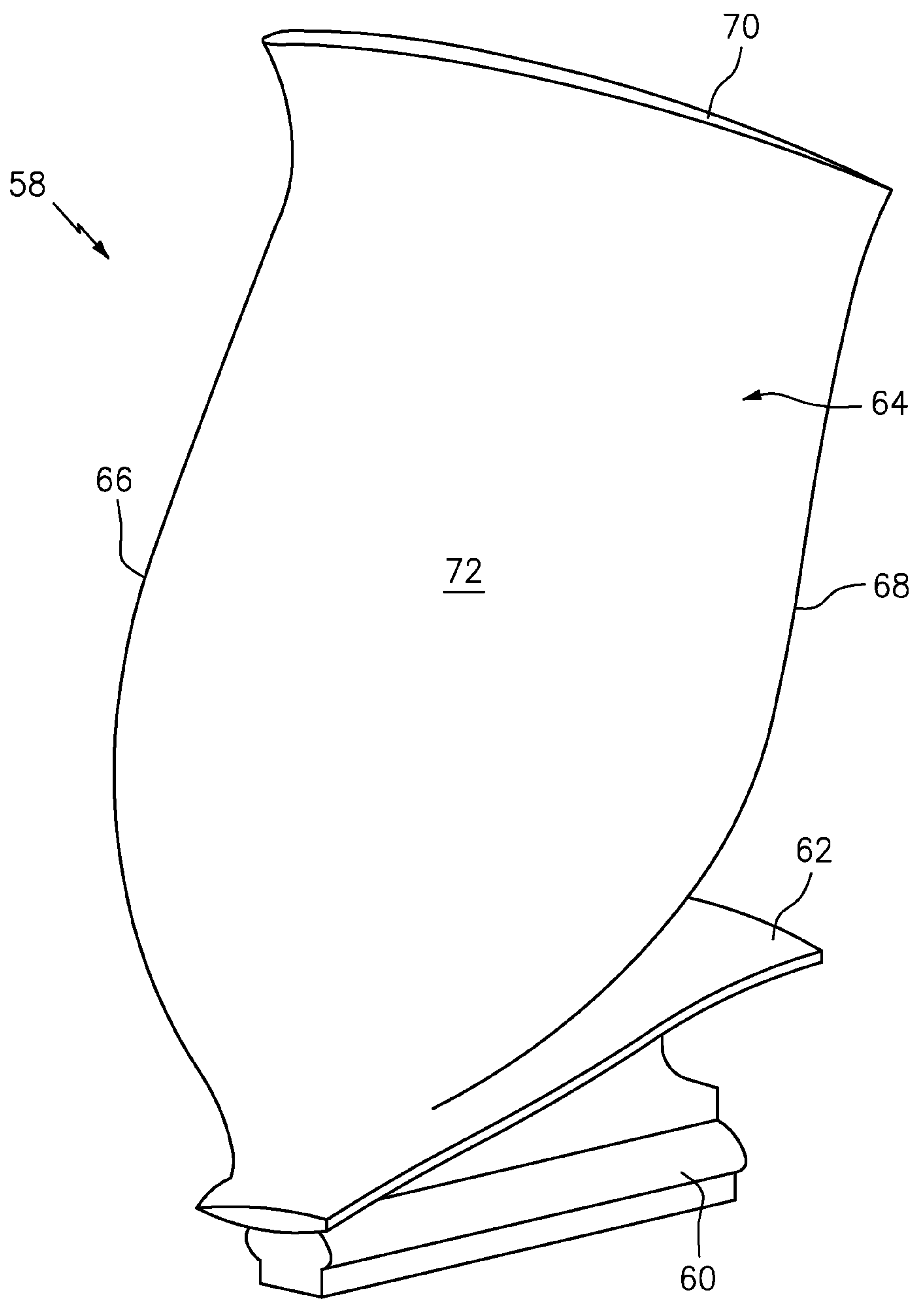
FIG. 2 is a schematic view of a fan blade for use in the gas turbine engine shown in FIG. 1.
Figure 3:
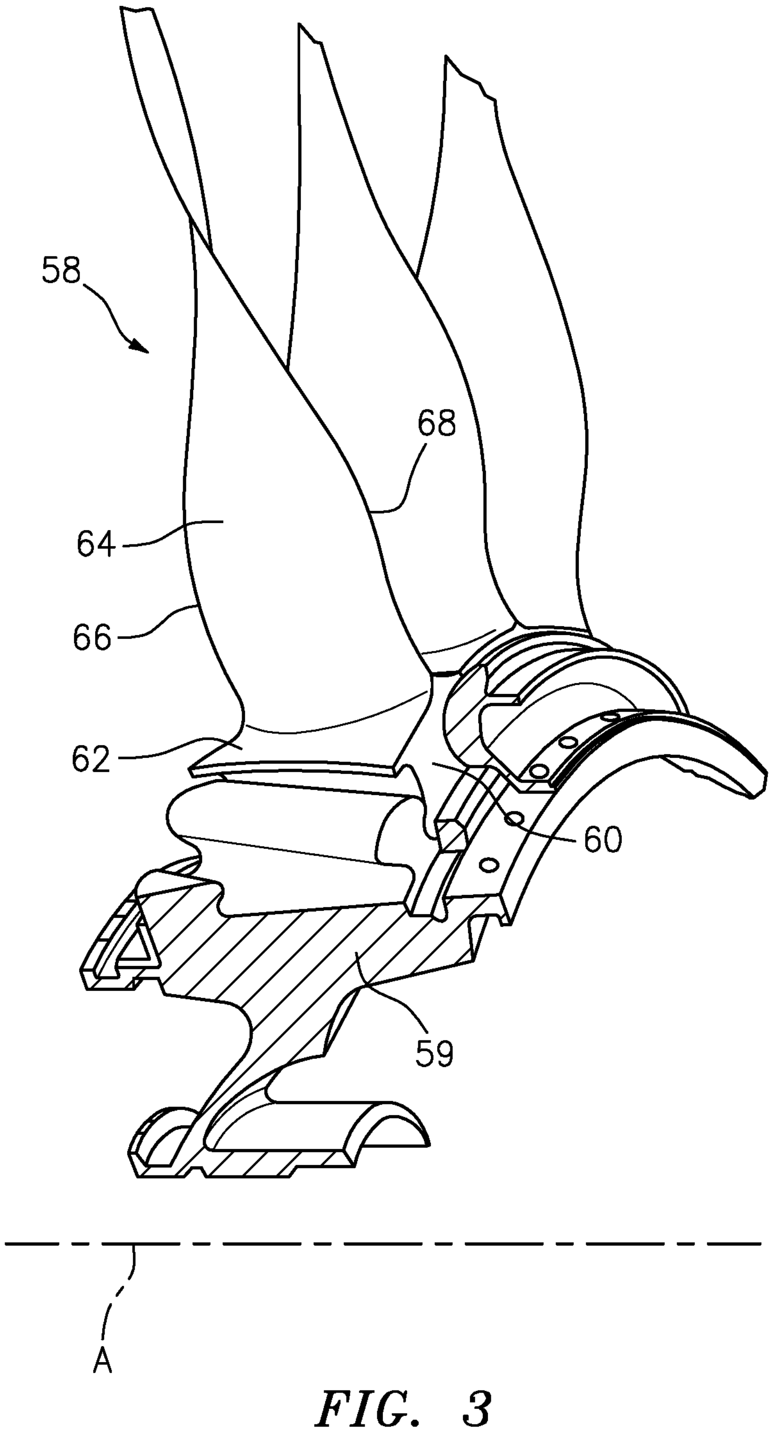
FIG. 3 is a perspective view of a rotor disk with the fan blade of FIG. 2 installed.

With reference to FIG. 2 and FIG. 3, each fan blade 58 generally includes an innermost root portion 60, an intermediate platform portion 62, and an outermost airfoil portion 64. In one form, the root portion 60 defines an attachment such as an inverted fir tree, bulb, or dovetail, so the fan blade 58 is slidably received in a complimentary configured recess provided in a fan rotor 59 (FIG. 3). The platform portion 62 generally separates the root portion 60 and the airfoil portion 64 to define an inner boundary of the air flow path. The airfoil portion 64 defines a blade chord between a leading edge 66, which may include various forward and/or aft sweep configurations, and a trailing edge 68. A concave pressure side 70 and a convex suction side 72 are defined between the leading edge 66 and the trailing edge 68. Although a fan blade 58 is illustrated in the disclosed non-limiting embodiments, compressor blades, turbofan blades, turboprop propeller blades, tilt rotor props, vanes, struts, and other airfoils may benefit herefrom.

Figure 4:
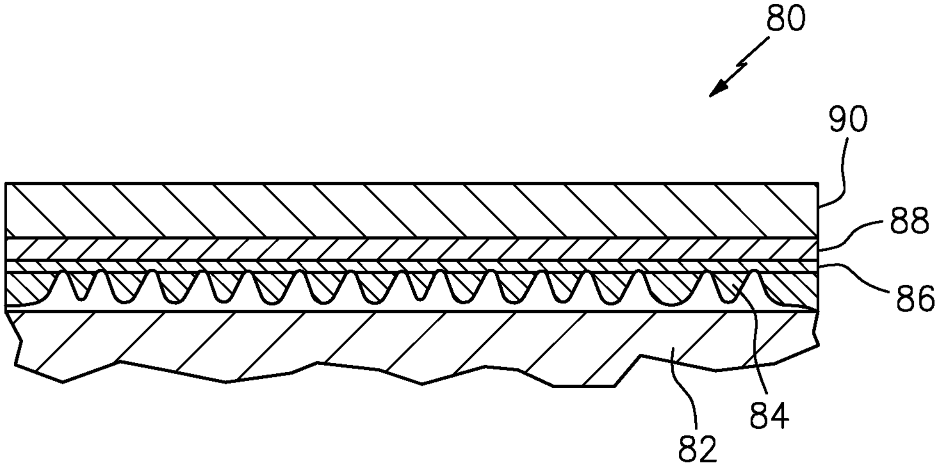
FIG. 4 is a sectional view of a coating for the example fan blade of FIG. 2.

With reference to FIG. 4, a coating 80 is applied to a substrate 82 of the fan blade 58. The coating 80 generally includes an aluminum oxide 84, a bond primer 86, a corrosion resistant primer 88, and an erosion coating 90.

The substrate 82, in this embodiment, is the fan blade 58 base metal (e.g., an aluminum alloy). The coating 80 protects the substrate 82 from corrosion, wear and other physical damage.

The aluminum oxide 84, in this embodiment, is an oxide layer formed through a chemical anodization process. The anodization process changes the surface morphology of the aluminum at the surface and creates an anodization layer up to 0.0001 inches (0.00254 mm) with a microscopic roughness that greatly increases the surface area for bonding and provides for some mechanical retention of bond primers.

The bond primer 86, in this embodiment, is an organic primer layer (e.g., epoxy-based) which may be spray-applied to a thickness of up to 0.0005 inches (0.0127 mm). The bond primer 86 is applied to increase the bond strength between the underlying aluminum/aluminum oxide 84 and the subsequent primers and coatings.

The corrosion resistant primer 88, in this embodiment, is an epoxy-based material and is loaded with hexavalent chromium as the active corrosion-resistant component. Alternatively, the corrosion resistant primer 88 is a non-hexavalent chromium based corrosion-resistant primer. The corrosion-resistant primer 88 is applied up to a thickness of 0.001 inches (0.0254 mm) to prevent corrosion of the underlying aluminum.

The erosion coating 90, in this embodiment, is an organic erosion coating (e.g., polyurethane) with a thickness of up to 0.030 inches (0.762 mm). The erosion coating 90 protects the underlying primers and metal substrate from damage due to particle and rain impact.

Figure 5:
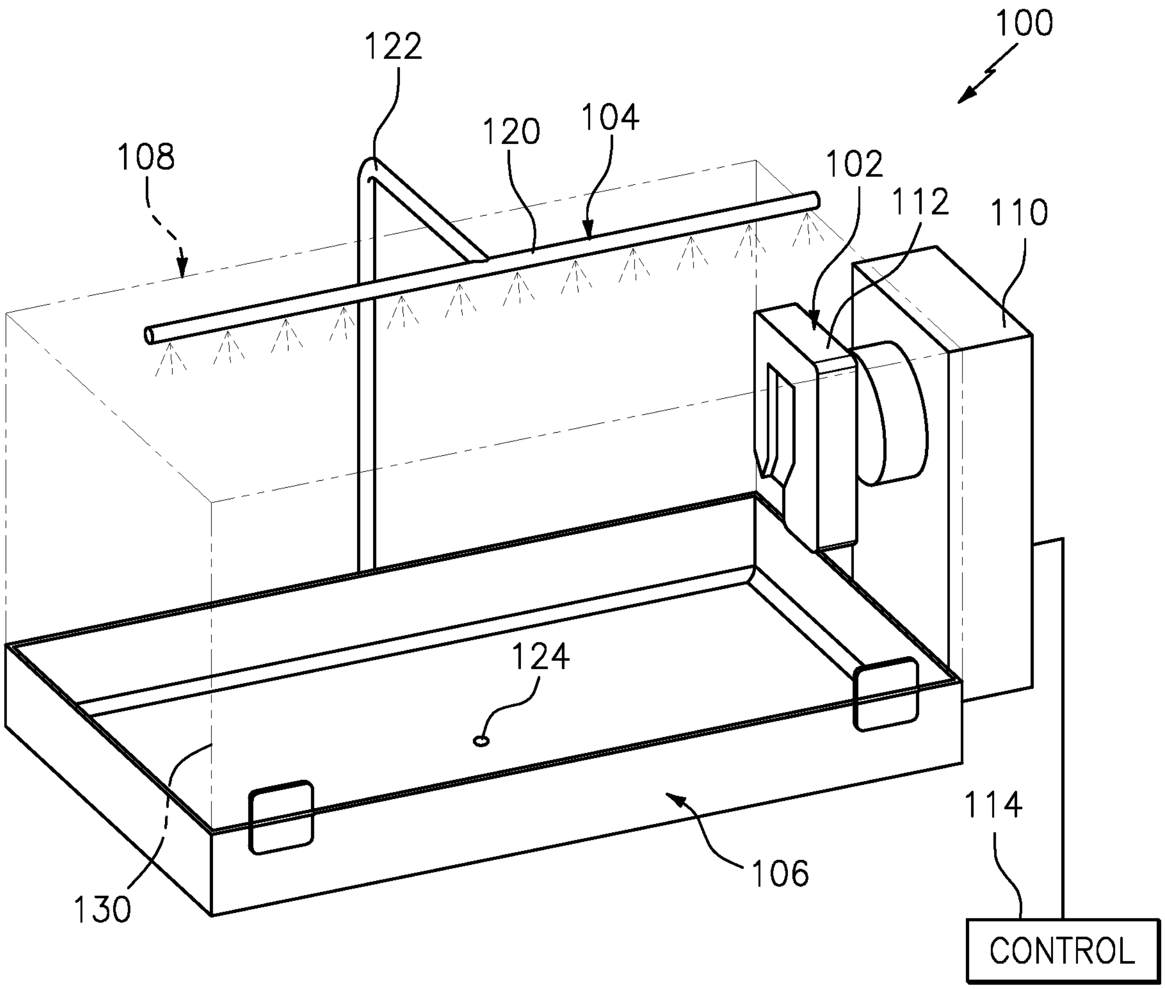
FIG. 5 is a perspective view of a drench station according to one disclosed non-limiting embodiment.

With reference to FIG. 5, a drench system 100 generally includes a rotating mount 102, a showerhead 104, a tray 106, and an enclosure 108. Although particular components are specifically identified, other components may alternatively or additionally be included in the drench system 100.

Figure 6:
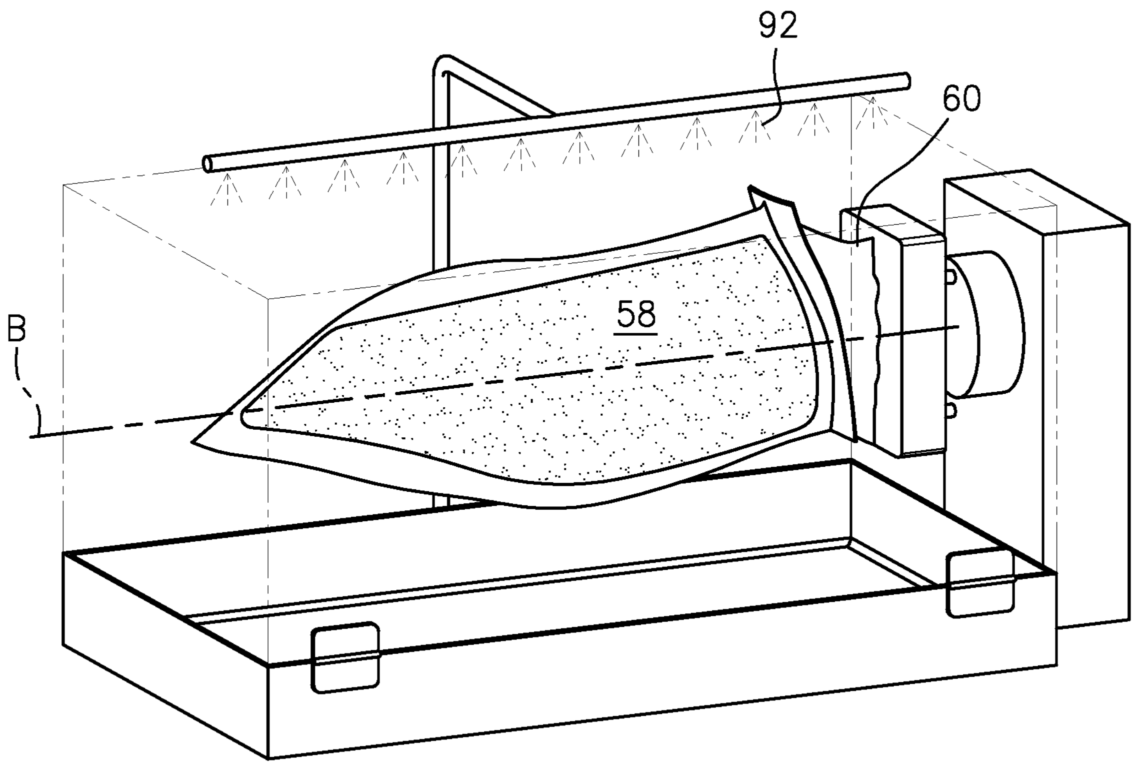
FIG. 6 is a perspective view of the drench station of FIG. 5 with a workpiece loaded therein.

The rotating mount 102 includes a motor 110 and a mount 112. The mount 112 receives the root portion 60 of the fan blade 58 to rotate the fan blade 58 around an axis B (FIG. 6). The fan blade 58 is an example of a workpiece, but other workpieces may also benefit from the drench system 100. The motor 110 is operable to rotate the mount 112 at various speeds in response to a control 114. In this embodiment, the motor 110 rotates the mount 112 at between 10-15 revolutions per minute (rpm).

Figure 7:
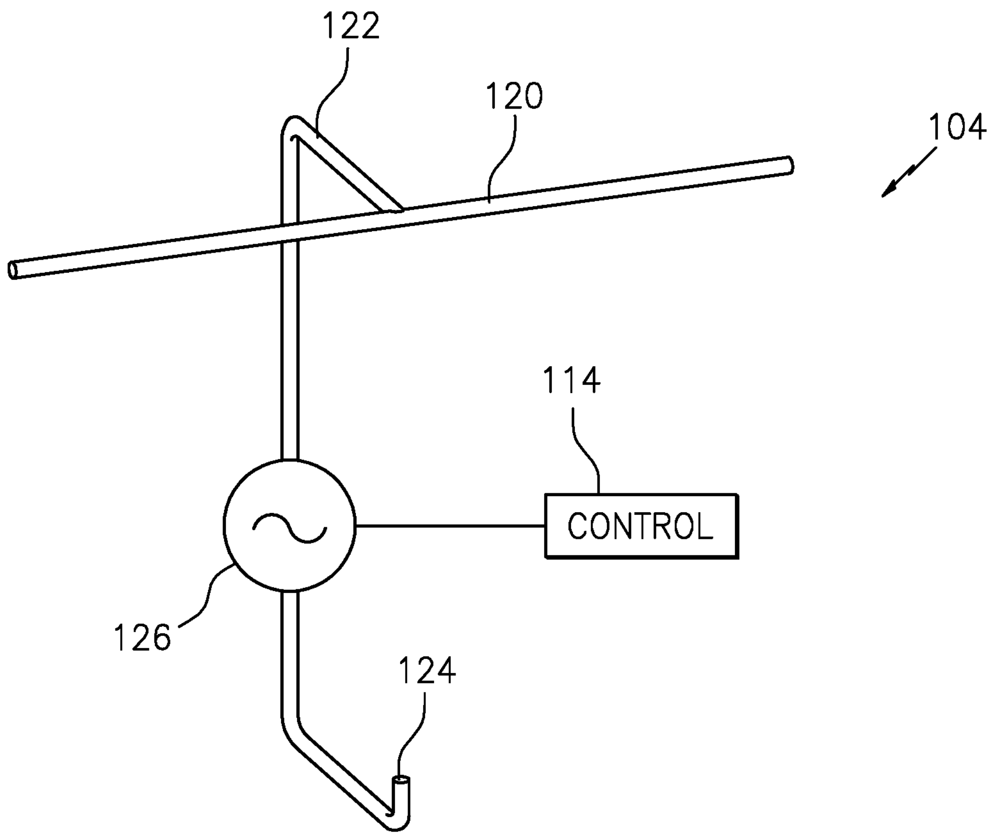
FIG. 7 is a perspective view of a showerhead subassembly for the drench station of FIG. 5.

The showerhead 104 includes a spray bar 120 and plumbing 122 that communicates with a drain 124 and a recirculation pump 126 (FIG. 7). The spray bar 120 extends for the length of the fan blade 58 (FIG. 6) to provide a stream, mist, or other flow of a fluid such as a sol-gel fluid (FIG. 6) (e.g., 3M™ Surface Pre-Treatment AC-130-2) over the entirety of the fan blade 58. The sol-gel fluid 92 is a water-based solution gelation (sol-gel) system to improve adhesive bonding of aluminum alloys, steel, titanium and composites. The sol-gel fluid involves hydrolysis and condensation of molecular or ionic precursors to form an oxide network.

The tray 106 includes the drain 124 associated with the showerhead 104 and the enclosure 108 that surrounds the workpiece. The enclosure 108 may be manufactured of translucent material and include a door 130 to facilitate containment and recirculation of the fluid. Since sol-gel has a relatively short pot life of about 10 hours and is relatively expensive, recirculation and thus the reuse of the sol-gel fluid is beneficial.

Figure 8:
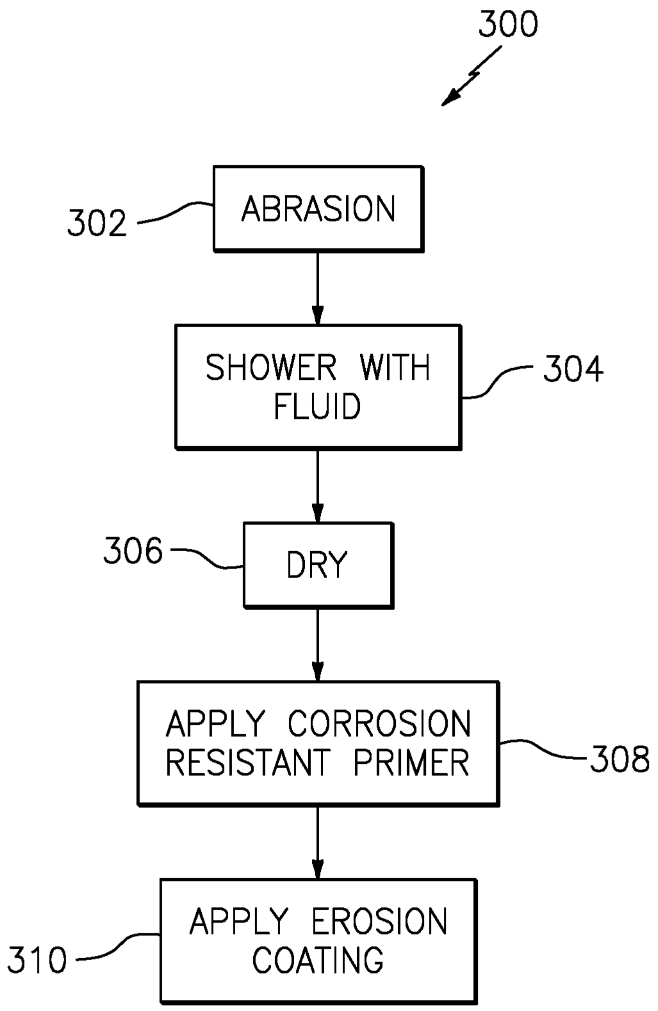
FIG. 8 is a flow diagram of a method of applying a coating according to one disclosed non-limiting embodiment using the drench station of FIG. 5.

With reference to FIG. 8, a method 300 for repairing or remanufacturing the coating 80 is schematically disclosed in terms of a functional block diagram flowchart. It should be appreciated that alternative or additional steps may be provided without departing from the teaching herein. The coating 80 (FIG. 4) may not be up to specification during manufacture or may be damaged such that remanufacture or repair of the coating 80 is necessitated.

Figure 9:
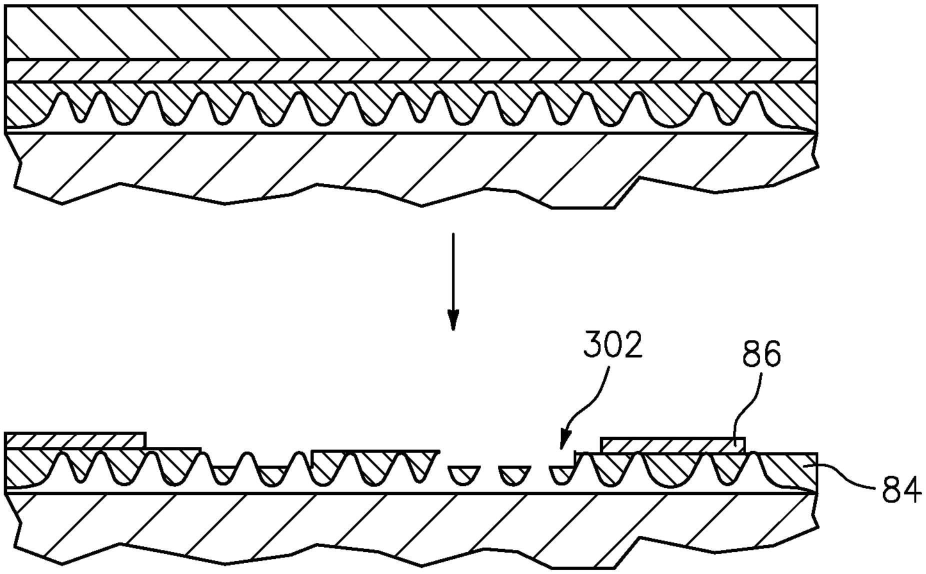
FIG. 9 is a sectional view of the coating for the example fan blade of FIG. 2 after an abrasive step.

The coating 80 to be remanufactured or repaired is initially abraded (302) to leave an abraded surface 302 (FIG. 9). At least the erosion coating 90, the corrosion resistant primer 88, and at least a portion of the bond primer 86 are typically removed by abrasion (e.g., grit blast, grinding, sanding, etc.). The resultant abraded surface 302 may be relatively rough in texture and be a mixed surface containing bare metal substrate and material remnants of the abraded layers 84, 86 and 88.

Figure 10:
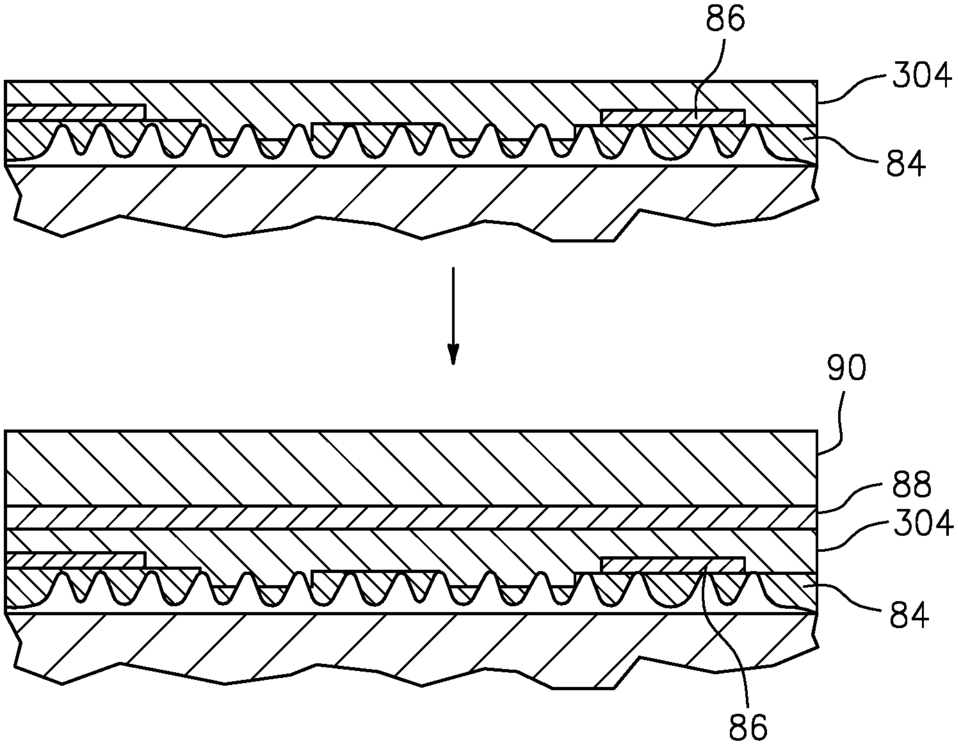
FIG. 10 is a sectional view of the coating for the example fan blade of FIG. 2 after a sol-gel layer has been applied using the drench station of FIG. 5.

Next, the sol-gel fluid is showered (304; FIG. 6) onto the abraded surface 302 to form a uniform sol-gel coating 304. The sol-gel fluid may be applied via the drench system 100 (FIG. 10) to form a uniform layer up to a thickness of 0.001 inches (0.0254 mm). The sol-gel fluid forms a bond to the abraded surface 302. The showerhead in this configuration can be configured to dispense fluid at about 2 gallons/minute.

As the blade 58 rotates within the drench system 100, a stream of sol-gel fluid is emitted from the showerhead 104 to coat the blade 58. As the blade position changes during rotation, excess sol-gel fluid streams off the edges 66, 68 and collects in the tray 106. The combination of rotational speed and sol-gel fluid viscosity allows the sol-gel fluid to coat the blade 58, but also to stream away excess sol-gel fluid. The blade 58 need not be fully coated via a fluid spray, but instead the sol-gel fluid collects on the surface and then washes over the blade 58 like a wave as the blade 58 tilts due to rotation. This process results in a very thin, uniform coating of the sol-gel after drying. Excess sol-gel fluid collected in the tray 106 is recirculated in the drench system 100 which permits an overall low charge of sol-gel fluid.

This is a key cost reduction feature as the sol-gel fluid is relatively expensive.

Figure 11:
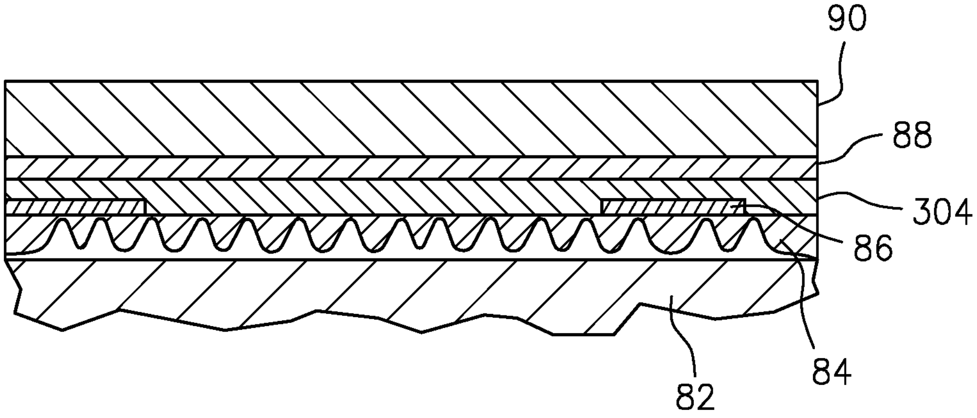
FIG. 11 is a sectional view of a repaired coating for the example fan blade of FIG. 2.

Once the sol-gel fluid is dry (306), the upper layers of the coating 80 are applied (FIG. 11; e.g., the corrosion resistant primer 88 is applied (308) onto the dry sol-gel 92, then, the erosion coating 90 is applied (310) onto the corrosion resistant primer 88.

Figure 12:
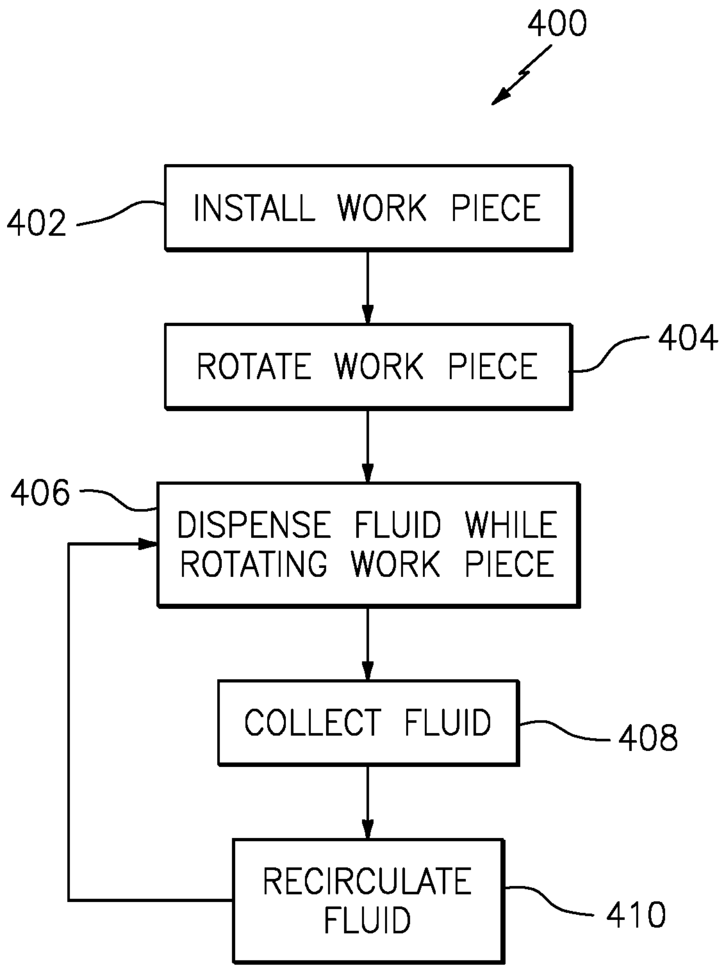
FIG. 12 is a flow diagram of a method of using the drench station of FIG. 5.

With reference to FIG. 12, a method 400 of applying a fluid to a workpiece is schematically disclosed in terms of a functional block diagram flowchart. It should be appreciated that alternative or additional steps may be provided without departing from the teaching herein.

Initially, the workpiece is installed (402) in the drench system 100. In this example, the fan blade 58 is the workpiece and installed in the mount 112. Next, the workpiece is rotated (404) in the rotating mount 102. While the workpiece is rotated, the fluid is dispensed (406) onto the workpiece and, as the fluid is dispensed, the fluid is also collected (408) in the tray 106 and recirculated (410) through the showerhead 104 in a closed loop manner.

The drench system 100 facilitates application of a uniform thin layer of a liquid or solvated material to a component and a cost-effective method of applying a sol-gel adhesion promoter. The drench system 100 reduces the volume of material necessary to coat when compared with conventional spray and submersion techniques.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that relative positional terms such as "forward," "aft," "upper," "lower," "above," "below," and the like are with reference to the normal operational attitude of the vehicle and should not be considered otherwise limiting.

It should be appreciated that like reference numerals identify corresponding or similar elements throughout the several drawings. It should also be appreciated that although a particular component arrangement is disclosed in the illustrated embodiments, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A method for repairing a coating on a workpiece, comprising:

abrading a coated surface of a workpiece to produce an abraded surface on the workpiece, wherein the workpiece originally has a coating comprising at least an erosion coating on a corrosion resistant primer, and wherein the abrading step removes the erosion coating and at least a portion of the corrosion resistant primer to produce the abraded surface;

mounting the workpiece relative to a showerhead and rotating the workpiece about an axis relative to the showerhead while dispensing a fluid from the showerhead onto the abraded surface of the workpiece;

collecting the fluid while dispensing;

recirculating collected fluid from the collecting step to the showerhead; and drying the workpiece to produce a workpiece having a substantially uniform thickness coating of the fluid over at least the abraded surface.

2. The method as recited in claim 1, wherein the workpiece is a fan blade.

3. The method as recited in claim 1, wherein the fluid is a sol-gel fluid.

4. The method as recited in claim 1, wherein the drying step forms a layer of sol-gel bonded to the abraded surface.

5. The method as recited in claim 1, wherein the showerhead is configured to dispense the fluid at about 2 gallons/minute.

6. The method as recited in claim 1, wherein rotating the workpiece includes rotating the workpiece at between 10-15 rpm.

* * * * *